(12) United States Patent
Nakamura et al.

(10) Patent No.: US 6,398,977 B1
(45) Date of Patent: Jun. 4, 2002

(54) STRONTIUM IRON OXIDE PARTICLE POWDER AND PROCESS FOR PRODUCING THE SAME

(75) Inventors: Tatsuya Nakamura; Yoji Okano; Akihisa Kajiyama, all of Hiroshima-ken (JP)

(73) Assignee: Toda Kogyo Corporation, Hiroshima (JP)

( * ) Notice: Subject to any disclaimer, the term of this patent is extended or adjusted under 35 U.S.C. 154(b) by 0 days.

(21) Appl. No.: 09/547,404

(22) Filed: Apr. 11, 2000

(30) Foreign Application Priority Data

Apr. 13, 1999 (JP) ............................................ 11-104904

(51) Int. Cl.$^7$ ............................................... C04B 35/26
(52) U.S. Cl. .................... 252/62.63; 423/594; 428/402; 501/123
(58) Field of Search .................. 423/594; 428/402; 252/62.56, 62.63; 501/123

(56) References Cited

U.S. PATENT DOCUMENTS

| | | | |
|---|---|---|---|
| 3,723,587 A | * | 3/1973 | Iwase et al. |
| 4,411,807 A | * | 10/1983 | Watanabe et al. |
| 4,425,250 A | * | 1/1984 | Hibst |
| 5,190,842 A | * | 3/1993 | Saha et al. |

FOREIGN PATENT DOCUMENTS

| | | | |
|---|---|---|---|
| JP | 50030280 | * | 9/1975 |
| JP | 02133324 | * | 5/1990 |
| JP | 10270816 | * | 10/1998 |

OTHER PUBLICATIONS

"Thermal Decomposition of Sr Fe Citrate" Gajbhiye et al. J Therm Anal Calor in (1988) , 51(2) pp. 517–27.*
"Ba iron Oxide & Sr iron Oxide Matles for cpd Systems with High Anisotropy" Kramer et al. Votr Poster—Symp Mat'lforsch (1991) vol. 3.*
"A Novel Preparation Method of Sr Iron Oxide Cubic Perovskike by Electrochemical Means" Wattiaux et al. Lab Chim Solid, 1991.*
Solid State Comm (1991), 77(7), pp. 489–93.*
"Strontium Iron oxide (SrFeO$_2$) Strontium Iron Oxide System" Tofield et al Mater Res Bull (1975, 10(7), 737–45.*
"Crystal Structure of β Sr Iron Oxide" Lucchini et al. Acta Crystolloy Sect. B (1973), 29 (Pt11) pp. 2356–7.*
Polymorphism in Sr Iron Oxide Lucchini et al J Mater Sci (1974) pp. 212–16.*

* cited by examiner

*Primary Examiner*—Paul Marcantoni
(74) *Attorney, Agent, or Firm*—Armstrong, Westerman & Hattori, LLP

(57) ABSTRACT

The present invention provides a hollow shape strontium iron oxide particle powder. Not only is the particle powder high in safety and excellent in workability, but exhibits a large dielectric constant when formed into an artificial dielectric material utilizing electrical conduction by being dispersed in an organic medium such as a rubber.

3 Claims, No Drawings

STRONTIUM IRON OXIDE PARTICLE POWDER AND PROCESS FOR PRODUCING THE SAME

BACKGROUND OF THE INVENTION

1. Field of the Invention

The present invention relates to a strontium iron oxide particle powder, in particular, to a strontium iron oxide perovskite particle powder and process for producing the same, and more specifically, to a strontium iron oxide particle powder high in safety and excellent in workability, which exhibits a large dielectric constant especially when an artificial dielectric material is prepared, making use of electrical conduction by dispersing it in an organic medium such as a rubber and a synthetic resin, in particular, and process for producing the same.

2. Description of the Prior Art

Conventionally, as a particle powder for use in an artificial dielectric material utilizing electrical conduction, a variety of metal powders such as carbon black have been hitherto used. For example, these artificial dielectric materials are used as a electromagnetic wave absorbing material, making use of frequency dispersion of their dielectric constant in radio frequency region. It is known that as its dielectric constant becomes larger, EM wave absorber becomes thinner.

However, when the above-mentioned carbon black is dispersed in an organic medium such as a rubber to form an artificial dielectric material utilizing electrical conduction, it exhibits a large dielectric constant, but since it comprises fine particles as small as approximately 0.01 to 0.02 $\mu$m, and high bulky powders, it tends to become dust, so that it is difficult to be handled, poor in workability and involves problems in safety because of carcinogenesis.

On the other hand, though some of the metal powders satisfy a demand of high safety as well as excellent workability, not indicating carcinogenesis or toxicity, when formed into an artificial dielectric material utilizing their electrical conduction by being dispersed in an organic medium such as a rubber, its dielectric constant is not so large and thus sufficient dielectric characteristics are not obtained.

SUMMARY OF THE INVENTION

An object of the present invention is to provide a strontium iron oxide particle powder high in safety and excellent in workability, which exhibits a large dielectric constant especially when an artificial dielectric material is prepared, making use of electrical conduction, by dispersing it in an organic medium such as a rubber and a synthetic resin, Another object of the present invention is to provide a process for producing the above-mentioned strontium iron oxide particle powder.

Further objects and advantages of the present invention will become apparent for those skilled in the art from the detailed description and explanation given below.

The present inventors have made an extensive series of studies and found out that the above-mentioned objects can be attained by a hollow shape strontium iron particle powder, especially obtained by preparing a mixed aqueous solution having a molar ratio Sr/Fe of 0.95 to 1.20, using a water-soluble strontium compound and an iron compound, drying the mixed aqueous solution to form a mixed powder, and calcining the mixed powder at 700 to 1000° C. in an oxygen-containing gas.

DETAILED DESCRIPTION OF THE INVENTION

The present invention is, in a first aspect, to provide a strontium iron oxide particle powder which is hollow in shape.

In a preferred embodiment, the average particle diameter of the above-mentioned strontium iron oxide particle powder is 2 to 100 $\mu$m (claim 2).

In a preferred embodiment, the above-mentioned strontium iron oxide particle powder is for use in an artificial dielectric material (claim 3).

The present invention is, in a second aspect, to provide a process for producing a strontium iron oxide particle powder which comprises the steps of:

preparing a mixed aqueous solution of a water-soluble strontium compound and an iron compound having a molar ratio of Sr/Fe being 0.915 to 1.20, drying the mixed aqueous solution with a spray dryer to form a mixed powder, calcining the mixed powder at 700 to 1000° C. in an oxygen-containing gas to thus form a hollow shape strontium iron oxide particle powder (claim 4).

The strontium iron oxide particle powder is characterized by being hollow in shape. The average particle diameter of the strontium iron oxide particle powder is 2 to 100 $\mu$m. If it is less than 2 $\mu$m or more than 100 $\mu$m, its production becomes difficult and thus it is not preferable.

To produce the hollow strontium iron oxide particle powder of the present invention, a mixed aqueous solution comprising a water-soluble strontium compound and an iron compound is first prepared.

The water-soluble strontium compound used in the present invention includes, for example, strontium hydroxide, strontium acetate and strontium nitrate, and these are used singly or in combination of two or more.

The iron compound used in the present invention includes, for example, iron nitrate, iron acetate, iron citrate and iron tartrate, and these are used singly or in combination of two or more.

The mixing ratio of the strontium compound and the iron compound is 0.95 to 1.20 in terms of Sr/Fe molar ratio, especially 1.0. If it is less than 0.95 or more than 1.20, hematite iron oxide or strontium carbonate coexists with the intended strontium iron oxide particle powder so that a particle powder exhibiting a sufficient dielectric constant is difficult to be obtained when formed into an artificial dielectric material utilizing electrical conduction by being dispersed in an organic medium such as a rubber and a synthetic resin.

The concentration of the mixed aqueous solution is preferable in a range of 5 to 30% by weight from the viewpoints of productivity and drying efficiency with a spray dryer in the subsequent step.

Next, a mixed powder is obtained by drying the above-mentioned mixed aqueous solution with a spray dryer. The drying conditions are not specifically limited and it may be conducted according to an ordinary method.

Then, the above-mentioned mixed powder is calcined at 700 to 1000° C. in an oxygen-containing gas, preferably in air. If the calcination temperature is lower than 700° C., a particle powder exhibiting a sufficient dielectric constant is difficult to be obtained when formed into an artificial dielectric material utilizing conduction by being dispersed in an organic medium such as a rubber. Inversely, if it is higher than 1000° C., though a perovskite strontium iron oxide particle powder is obtained, the sintering among particles occurs remarkably so that large impacting force is required in the subsequent grinding step. The calcination time is not specifically limited and usually in a range of 1 to 10 hours.

In the above-mentioned way, a hollow shape strontium iron oxide particle powder, 2 to 100 μm in average particle diameter is obtained. The thus obtained hollow shape strontium iron-oxide particle powder is useful as, for example, an artificial dielectric material, which is prepared by dispersing the hollow shape strontium iron oxide particle powder in an organic medium such as a rubber like neoprene rubber and a synthetic resin like ethylene-vinyl acetate copolymer and polyphenylene sulfide.

The mixing ratio of the strontium iron oxide particle powder of the present invention with the organic medium is preferably in a range of 50 to 90% by weight. If it is less than 50% by weight, a sufficient dielectric constant is not obtained, and inversely, if it is more than 90% by weight, mixing and molding tend to become extremely difficult.

Hereinafter, the present invention will be explained in more detail by way of examples, but the present invention is in no way limited to those examples as long as not exceeding the gist of the present invention.

Meanwhile, the particle shape, the particle diameter and the dielectric constant were measured in the manner as described below:

(1) Particle Shape and Particle Diameter

The particle shape was observed by a transmission electron microscope and the particle diameter was indicated by an average value measured from a transmission electron microscopic photograph.

(2) Dielectric Constant

A strontium iron oxide particle powder and an ethylene-vinyl acetate copolymer resin are mixed so that the proportion of the oxide particle powder is 85% by weight, and kneaded at 80° C. by the use of a plastomill. The obtained mixture was formed into a sheet by the use of double-screw hot rollers heated to 60° C. This sheet was punched by the use of a metal mold to obtain a ring-shaped specimen, 38.5 mm in outer diameter and 17 mm in inner diameter. This ring-shaped specimen was inserted into a coaxial line and its dielectric constant was measured at measurement frequencies of 10 MHz, 100 MHz and 1 GHz by the use of Network Analyzer-HP 8753 C manufactured by Hewlett-Packard Inc.

EXAMPLE 1

Using iron nitrate as an iron material and strontium hydroxide as a strontium compound, a mixed aqueous solution (concentration: 20% by weight) having a molar ratio of Sr/Fe being 1.0 was prepared. Then, this aqueous solution was dried with a spray dryer to thus obtain a mixed powder. Further, this mixed powder was introduced into an alumina crucible where calcination was conducted at 900° C. in air for 5 hours to thus obtain a black powder. The obtained black powder was found to be a perovskite strontium iron oxide by powder X-ray diffraction.

As shown in Table 1, as a result of observation by an electron microscope, it was a hollow shape particle having the particle diameter of 55 μm. The dielectric constants of the mixture comprising the perovskite strontium iron oxide particle powder and the ethylene-vinyl acetate copolymer resin were 32, 30, 28, respectively, at the measurement frequencies of 10 MHz, 100 MHz and 1 GHz, respectively.

EXAMPLES 2 to 5, COMPARATIVE EXAMPLES 1 TO 3

Black powders were obtained in the same manner as in Example 1, except that the molar ratios Sr/Fe and calcination conditions were varied as shown in Table 1.

Main preparation conditions and the characteristics (particle diameter and dielectric constant) were shown in Table 1.

As a result of powder X-ray diffraction, the black powders obtained in Examples 2 to 5 were perovskite strontium iron oxides, and as a result of observation of an electron microscope, those were hollow in shapes and exhibited large dielectric constants.

On the other hand, the black powder obtained in Comparative Example 1 was a perovskite strontium iron oxide and hollow in shape as a result of observation by an electron microscope, but its dielectric constant was small as shown in Table 1.

The black powders obtained in Comparative Examples 2 and 3 were a mixture of a perovskite strontium iron oxide and strontium carbonate, and a mixture of a perovskite strontium iron oxide and a hematite iron oxide, respectively. Those powders were hollow in shapes and their dielectric constants were small.

COMPARATIVE EXAMPLE 4

Using hematite as an iron oxide particle powder and strontium hydroxide as a strontium Compound, those were throughly mixed in an automatic mortar in a molar ratio of Sr/Fe being 1.0. The obtained mixed powder was introduced into an alumina crucible where it was calcined at 900° C. in air for 5 hours, to thus obtain a black powder. Its characteristics (particle diameter and dielectric constant) were shown in Table 1.

As a result of powder X-ray diffraction, the obtained black powder was a perovskite strontium iron oxide and as an observation by an electron microscope, it was an irregular particle having a particle diameter of 0.5 μm and its dielectric constant was small.

TABLE 1

|  | Preparation conditions | | Characteristics of strontium iron oxide particle powder | | | |
| --- | --- | --- | --- | --- | --- | --- |
|  | Sr/Fe molar ratio | Calcination temperature (° C.) | Particle diameter (μm) | Dielectric constant | | |
|  |  |  |  | 10 MHz | 100 MHz | 1 GHz |
| Example 1 | 1.00 | 900 | 55.0 | 32 | 30 | 28 |
| Example 2 | 1.00 | 800 | 55.0 | 30 | 29 | 28 |
| Example 3 | 0.98 | 1000 | 45.0 | 33 | 31 | 28 |
| Example 4 | 1.10 | 850 | 50.0 | 32 | 31 | 29 |

TABLE 1-continued

|  | Preparation conditions | | Characteristics of strontium iron oxide particle powder | | | |
| --- | --- | --- | --- | --- | --- | --- |
|  | Sr/Fe molar ratio | Calcination temperature (° C.) | Particle diameter (μm) | Dielectric constant | | |
|  |  |  |  | 10 MHz | 100 MHz | 1 GHz |
| Comp. Example 1 | 1.00 | 600 | 60.0 | 12 | 12 | 11 |
| Comp. Example 2 | 2.00 | 950 | 45.0 | 15 | 14 | 13 |
| Comp. Example 3 | 0.80 | 1000 | 50.0 | 13 | 13 | 12 |
| Comp. Example 4 | 1.00 | 900 | 0.5 | 20 | 19 | 18 |

As stated above, the strontium iron oxide particle powder of the present invention not only exhibits a large dielectric constant, but possesses high safety and excellent workability, for example, when formed into an artificial dielectric material by being dispersed in an organic medium such as a rubber and a synthetic resin.

What is claimed is:

1. A strontium iron oxide particle powder which is hollow in shape.

2. The strontium iron oxide particle powder of claim 1, wherein an average particle diameter is 2 to 100 μm.

3. The strontium iron oxide particle powder of claim 1 or 2, wherein it is for use in an artificial dielectric material.

* * * * *